Patented Feb. 9, 1954

2,668,771

UNITED STATES PATENT OFFICE 2,668,771

STABLE CURING SALT COMPOSITION AND MANUFACTURE THEREOF

Lloyd A. Hall, Chicago, Ill., assignor to The Griffith Laboratories, Inc., Chicago, Ill., a corporation of Illinois No Drawing. Application June 29, 1951, Serial No. 234,460

14 Claims. (Cl. 99—222)

1

The present invention relates generally to curing salt compositions for meat and meat products, and in particular it relates to improvements in such compositions wherein an alkali metal nitrite is housed within a crystal of sodium chloride.

It is known that when a concentrated solution of sodium chloride containing a minor amount of curing salt selected from the group consisting of nitrates and nitrites of alkali metal, is flash dried, the sodium chloride forms minute crystals having heart-like centers of such curing salt, whether it be a nitrite, or a nitrate, or a mixture of the two. The process and product are described in Griffith Patent No. 2,054,624.

Commercially, such a product presents certain difficulties which have been variously overcome. When the heart-center crystals are flash dried, as on heated rotating drums, the crystals trap minute quantities of water as well as the material of the hearts. On standing, and thereby altering to more stable forms, the trapped water is released and causes the originally dry powder to cake. By including a hygroscopic agent, the latter takes up the water and minimizes or prevents the tendency to cake. As such agent commercial corn sugar, or a mixture of the latter with glycerin, has been used.

According to Hall Patent No. 2,145,417, the corn sugar with or without glycerin may be included in the solution to be dried, to distribute it uniformly for its function. However, corn sugar as an anticaking agent, was found by Hall to introduce a trace of acid, as an inherent impurity in the sugar. The acid gradually reacted with the nitrite salt of the composition to release nitrous acid. Hall avoided this and stabilized the product as to loss of nitrous acid by including a buffering agent, such as sodium bicarbonate or disodium phosphate, to insure a final pH in the composition not under pH of 7.4.

The present invention is based upon difficulties encountered in attempts to enhance the noncaking effect by increasing the content of liquid forming hygroscopic agents, such as glycerin, sorbitol (1.2.3.4.5.6-hexanehexol) and propylene glycol, which on absorbing water form a liquid as a lubricating or partitioning agent between the crystals. It has been found that even where the pH is at or over 7.4 to avoid liberation of nitrous acid, the composition is not stable in its nitrite content, and additionally is unstable in its nitrate content. It was found that nitrite oxidized to nitrate. By practice of the present invention this oxidation may be minimized or avoided.

2

Studies of the difficulties have shown that there is a catalytic oxidation of nitrite to nitrate, with cations as the catalyst. The cations result from ionization of trace amounts of metal compounds. These compounds are harmless when dry, but become ionized as water gathers in the liquid partitioning agent. Among the catalytic cations may be relatively large amounts of calcium and magnesium from using untreated natural or hard water in preparing the solution, and minor amounts of more potent catalytic cations such as copper, iron, aluminum, manganese, chromium, nickel, cobalt and lead. In the presence of a predominance of sodium chloride, these various impurities ionize and function as if derived from their chloride salts.

Even though the curing salt materials dissolved are relatively pure, trace amounts of the catalytic metals enter the solution to be flash dried, by contact with metal vessels, conduits and fittings. Raw water before addition of salt adopts such traces, and after adding salt, and especially when hot, it is more corrosive of metal to adopt more trace quantities. When impure, or commercial supplies of the several curing salts are used, it is known that some catalyst ions are present therein.

It is the primary object of the invention to provide a long-stable heart-center curing salt composition containing nitrite curing salt.

It is an object of the present invention to render ineffective those cations which normally fuction as oxidation catalysts to convert nitrite to nitrate.

It is a particular object of the invention to add to the salt solution to be dried one or more sequestering agents which are stable in the flash drying process.

Various other and ancillary objects and advantages of the invention will become apparent from the following description and explanation of the invention.

It is known that the hardness minerals in natural waters, which ionize to provide cations of calcium or magnesium may be maintained in solution and rendered ineffective as reactive cations, by adding sequestering agents. Broadly, these are soluble compounds which react with such cations to form complexes in which the troublesome metal is part of a complex anion. As such it is not reactive as a cation.

I have found that water soluble sequestering salts of polyphosphoric acids, including those which are conventional sequestering agents, and commonly used in treating natural waters for domestic and industrial uses, may be added to the strong salt solutions which are used for flash-drying to form heart-center crystals, to minimize or prevent catalytic oxidation. They sequester those cations which are oxidation catalysts, and the resulting sequestering compounds in the dried composition are stable against release of the sequestered metals to revert to cations, when the curing composition is in storage with a content of aqueous liquid partitioning agent normally capable of inducing conditions ripe for catalytic oxidation of nitrite to nitrate.

The amount of sequestering polyphosphate salt required is very small in proportion to the whole, and the minimum amount needed for complete sequestering of course depends upon the kinds and content of catalytic cation impurities. The several sources of such impurities are points of attack for selection or treatment to minimize the introduction of material which is a source of oxidation catalyst.

The raw water introduces its mineral hardness and in heating it and in adding salts to it, it becomes more corrosive to adopt metal by contact with vessels, conduits and fittings. The impurities in the various curing salts employed are other sources of catalyst for the final product. For example, normal city water originating in Lake Michigan is characterized as follows:

| | Parts per million |
|---|---|
| Total hardness as $CaCO_3$ | 134.8 |
| Total solids | 189.0 |
| $SiO_2$ | 2.8 |
| Fe and Al | 0.2 |
| Cr | 0.0 |
| Mn | 0.0 |
| Cu | .01 |
| Pb | .04 |
| Ca | 36.8 |
| Mg | 10.4 |
| $SO_4$ | 17.2 |
| Cl | 6.0 |
| $CO_3$ | 2.0 |
| $HCO_3$ | 68.0 |
| $PO_4$ | .0023 |
| F | .07 | pH=8.21.

The content of total solids is low so that only a small amount of sequestering agent is required. But the amount is not predetermined wholly by the water, and an excess is used for safety, the minimum being a very small amount based on the final composition.

Polyphosphate salts are salts of molecularly dehydrated phosphoric acid varying from the ratio $1H_2O$ to $1P_2O_5$ to the ratio $2H_2O$ to $1P_2O_5$, or in other words from the theoretical metaphosphoric acid ($HPO_3$) to pyrophosphoric acid ($H_4P_2O_7$). Salts of these acids exist in all compositions in the range given, some being crystallizable compounds, and others being glasses. The commonly used salts are of sodium or other alkali metal or ammonium but metal or ammonium hydrogen salts exist in some cases. The sequestering property is not limited to alkali-metal or ammonium salts. Complex glasses exist wherein alkali metal and one or more other metals, namely, magnesium, calcium, strontium, barium, aluminum, and iron are effective components of sequestering water-soluble polyphosphate salts. These and their properties are described in King Nos. 2,370,472, 2,370,473 and 2,395,126.

Particularly effective are the several forms of sodium tripolyphosphate ($NaP_3O_{10}$) described in King No. 2,419,147 and No. 2,419,148. Tetrasodium pyrophosphate and sodium tripolyphosphate are common crystalline sequestering polyphosphates. "Polyphos" is a common glassy form of sodium polyphosphate available in commerce. Metaphosphoric acid yields various salts, for example, with sodium. Sodium trimetaphosphate is crystalline and is an exception in not being a sequestering agent. However, sodium hexametaphosphate is a glass and is a sequestering agent. It is extensively used as such. The only requirement is that the sequestering polyphosphate salt be soluble in the amount required, and this requirement becomes more important when the polyphosphate salt comprises metals other than the alkali metals, as above referred to.

A commercial refined sodium chloride may contain from 4 to 10 p. p. m. of iron as Fe and 1 to 4 p. p. m. of copper as Cu. These are powerful oxidation catalysts when present as cations, but are nullified by sequestration, even though present in a dissolved form.

Commercial forms of sodium nitrite or nitrate frequently contain catalytically effective impurities as follows:

| | Parts per million |
|---|---|
| Cu | 1.3 |
| Pb | .4 |
| Mn | .1 |
| Ni | .4 |

Using raw tap water containing hardness from calcium and magnesium, which derive largely from the water supply, and which may be removed by base-exchange treatment, there has been produced using glycerin, sorbitol or propylene glycol, as an anti-caking agent, a meat-curing composition of sodium chloride, sodium nitrate and sodium nitrite, of which the nitrite content is subject to oxidation after about three weeks, with highly active impurities as follows:

| | Parts per million |
|---|---|
| Cu | 2.0 |
| Cr | 0.5 |
| $Fe_2O_3$ | 5.5 |
| Ni | 0.8 |
| Co | 0.2 |
| Pb | 0.2 |
| Mn | 0.2 |
| $Al_2O_3$ | 2.0 |
| Ca | 25.0 |
| Mg | 6.0 |

By using a sequestering polyphosphate salt in amount from as low as 45 parts per million of the total salt composition, the oxidation is avoided for a year or longer. However, analysis shows the same metals present, these being present in sequestered form and hence ineffective catalytically.

In carrying out the invention a solution in water containing curing salt content to about 27.4% solids is heated to 165° to 185° F. and splashed or sprayed onto heated rotating drums at about 160° C. Preferably, the water employed is city tap water from which hardness has been removed by sodium or potassium base exchange solids, of zeolite, resin or other type, all well known. Suitable solids content formulas are given below with the parts by weight in pounds except as otherwise appearing:

| Example | 1 | 2 | 3 | 4 | 5 |
|---|---|---|---|---|---|
| Sodium chloride | 2,481 | 2,481 | 2,198 | 2,407 | 2,481 |
| Sodium nitrite | 173 | 173 | 342 | 173 | 173 |
| Sodium nitrate | 117 | 117 | 231 | 191 | 117 |
| Glycerin [1] | 9 | 9 | 9 | 9 | 9 |
| Polyphosphate: | | | | | |
| $Na_5P_3O_{10}$ oz | 4 | | 4 | 2 | |
| $Na_4P_2O_7$ oz | | 4 | | | |
| $NaPO_3$ (hexameta) oz | | | | | 4 |

[1] Or sorbitol, or propylene glycol.

For the general run of domestic potable water and of commercially refined salts in the above formulations, the amount of sequestering agents shown vary from about 45 to 90 parts per million of the solids in solution. In the foregoing examples the hygroscopic agent, which may be glycerine, sorbitol or propylene glycol may be used in amount upwardly from approximately 3 parts by weight to 1000 parts of total salt content.

The solution which is flash dried is adjusted to have a pH of 7.4 or greater, to stabilize the nitrite salt against acidic reaction to release nitrous acid. This may be done by use of sodium bicarbonate, if necessary, or it may be effected indirectly by exchanging the calcium and magnesium hardness ions in a hard tap water for sodium by base-exchange reaction, thereby introducing sodium bicarbonate and effectively stabilizing the natural alkalinity of the hard water.

Although the formulas above given show the nitrite and nitrate to be of sodium, this is not essential, but only commercially desirable. By reference to the said Griffith Patent No. 2,054,624, it will be appreciated that potassium nitrite or nitrate, or mixtures of the sodium and potassium salts, may constitute the heart-like centers of salt crystals. And likewise, the sequestering polyphosphate salt may be of potassium.

It is to be understood that the proportions of sodium chloride and of alkali metal nitrite, with or without alkali nitrate, may be changed as well known in the art, without departing from the spirit and scope of the present invention as set forth in the appended claims.

I claim:

1. A curing salt composition having a stabilizing pH not under 7.4 and comprising sodium chloride crystals having heart-like centers of oxygen-containing nitrogen meat-curing salt of alkali metal including essentially alkali-metal nitrite, a minor quantity of a hygroscopic partitioning anti-caking agent selected from the group consisting of glycerin, sorbitol and propylene glycol, and a small and sequestering quantity of water-soluble sequestering polyphosphate salt in sequestering relation to metal molecules which in cation form are oxidation catalysts for said nitrite salt, whereby said nitrite salt is stabilized on storing of the mixture.

2. A curing salt composition having a stabilizing pH not under 7.4 and comprising sodium chloride crystals having heart-like centers of oxygen-containing nitrogen meat-curing salt of sodium including essentially sodium nitrite, a minor quantity of a hygroscopic partitioning anti-caking agent selected from the group consisting of glycerin, sorbitol and propylene glycol, and a small and sequestering quantity of water-soluble sequestering polyphosphate salt in sequestering relation to metal molecules which in cation form are oxidation catalysts for said nitrite salt, whereby said nitrite salt is stabilized on storing of the mixture.

3. A curing salt composition having a stabilizing pH not under 7.4 and comprising sodium chloride crystals having heart-like centers of nitrite and nitrate of alkali metal, a minor quantity of a hygroscpoic partitioning anti-caking agent selected from the group consisting of glycerin, sorbitol and propylene glycol, and a small and sequestering quantity of water-soluble sequestering polyphosphate salt in sequestering relation to metal molecules which in cation form are oxidation catalysts for said nitrite salt, whereby said nitrite salt is stabilized on storing of the mixture.

4. A curing salt composition having a stabilizing pH not under 7.4 and comprising sodium chloride crystals having heart-like centers of oxygen-containing nitrogen meat-curing salt of alkali metal including essentially alkali-metal nitrite, a minor quantity of a hygroscopic partitioning anti-caking agent selected from the group consisting of glycerin, sorbitol and propylene glycol, and a small and sequestering quantity of water-soluble sequestering alkali metal polyphosphate salt in sequestering relation to metal molecules which in cation form are oxidation catalysts for said nitrite salt, whereby said nitrite salt is stabilized on storing of the mixture.

5. A curing salt composition having a stabilizing pH not under 7.4 and comprising sodium chloride crystals having heart-like centers of oxygen-containing nitrogen meat-curing salt of sodium including essentially sodium nitrite, a minor quantity of a hygroscopic partitioning anti-caking agent selected from the group consisting of glycerin, sorbitol and propylene glycol, and a small and sequestering quantity of water-soluble sequestering sodium polyphosphate salt in sequestering relation to metal molecules which in cation form are oxidation catalysts for said nitrite salt, whereby said nitrite salt is stabilized on storing of the mixture.

6. A curing salt composition having a stabilizing pH not under 7.4 and comprising sodium chloride crystals having heart-like centers of nitrite and nitrate of alkali metal, a minor quantity of a hygroscopic partitioning anti-caking agent selected from the group consisting of glycerin, sorbitol and propylene glycol, and a small and sequestering quantity of water-soluble sequestering alkali metal polyphosphate salt in sequestering relation to metal molecules which in cation form are oxidation catalysts for said nitrite salt, whereby said nitrite salt is stabilized on storing of the mixture.

7. A curing salt composition having a stabilizing pH not under 7.4 and comprising sodium chloride crystals having heart-like centers of oxygen-containing nitrogen meat-curing salt of alkali metal including essentially alkali-metal nitrite, a minor quantity of a hygroscopic material which in taking on water forms a liquid partitioning anti-caking agent between the crystals, and a small and sequestering quantity of water-soluble sequestering polyphosphate salt in sequestering relation to metal molecules which in cation form are oxidation catalysts for said nitrite salt, whereby said nitrite salt is stabilized on storing of the mixture.

8. The method which comprises dissolving in water quantities of sodium chloride and of oxygen-bearing nitrogen curing salt of alkali metal including essentially nitrite of alkali metal, the proportions of said salts being such as to form on flash drying the solution a mass of sodium chloride crystals having heart-like centers of said nitrogen curing salt, dissolving also for each 1000 parts total weight of said salts upwardly from approximately 3 parts by weight of hygroscopic material selected from the group consisting of glycerin, sorbitol and propylene glycol, dissolving also in said water a small and sequestering quantity of sequestering water-soluble polyphosphate salt for cation impurities in the resulting solution, and flash-drying said solution buffered to a pH of at least 7.4 whereby to form stable heart-center crystals.

9. The method which comprises dissolving in water quantities of sodium chloride and of oxygen-bearing nitrogen curing salt of sodium including essentially sodium nitrite, the proportions of said salts being such as to form on flash drying the solution a mass of sodium chloride crystals having heart-like centers of said nitrogen curing salt, dissolving also for each 1000 parts total weight of said salts upwardly from approximately 3 parts by weight of hygroscopic material selected from the group consisting of glycerin, sorbitol and propylene glycol, dissolving also in said water a small and sequestering quantity of sequestering water-soluble polyphosphate salt for cation impurities in the resulting solution, and flash-drying said solution buffered to a pH of at least 7.4 whereby to form stable heart-center crystals.

10. The method which comprises dissolving in water qauntities of sodium chloride and of nitrite and nitrate curing salts of alkali metal, the proportions of said salts being such as to form on flash-drying the solution a mass of sodium chloride crystals having heart-like centers of said curing salts, dissolving also for each 1000 parts total weight of said salts upwardly from approximately 3 parts by weight of hygroscopic material selected from the group consisting of glycerin, sorbitol and propylene glycol, dissolving also in said water a small and sequestering quantity of sequestering water-soluble polyphosphate salt for cation impurities in the resulting solution, and flash-drying said solution buffered to a pH of at least 7.4 whereby to form stable heart-center crystals.

11. The method which comprises dissolving in water qauntities of sodium chloride and of nitrite and nitrate curing salt of sodium, the proportions of said salts being such as to form on flash-drying the solution a mass of sodium chloride crystals having heart-like centers of said nitrogen curing salts, dissolving also for each 1000 parts total weight of said salts upwardly from aproximately 3 parts by weight of hygroscopic material selected from the group consisting of glycerin, sorbitol and propylene glycol, dissolving also in said water a small and sequestering quantity of sequestering water-soluble polyphosphate salt for cation impurities in the resulting solution, and flash-drying said solution buffered to a pH of at least 7.4 whereby to form stable heart-center crystals.

12. The method which comprises dissolving in water quantities of sodium chloride and of oxygen-bearing nitrogen curing salt of sodium including essentially sodium nitrite, the proportions of said salts being such as to form on flash drying the solution a mass of sodium chloride crystals having heart-like centers of said nitrogen curing salt, dissolving also for each 1000 parts by weight of said salts upwardly from approximately 3 parts by weight of hygroscopic material selected from the group consisting of glycerin, sorbitol and propylene glycol, dissolving also in said water a small and sequestering quantity of sequestering water-soluble sodium polyphosphate salt for cation impurities in the resulting solution, and flash-drying said solution buffered to a pH of at least 7.4 whereby to form stable heart-center crystals.

13. The method which comprises dissolving in water quantities of sodium chloride and of nitrite and nitrate curing salt of sodium, the proportions of said salts being such as to form on flash drying the solution a mass of sodium chloride crystals having heart-like centers of said nitrogen curing salts, dissolving also for each 1000 parts by weight of said salts upwardly from approximately 3 parts by weight of hygroscopic material selected from the group consisting of glycerin, sorbitol and propylene glycol, dissolving also in said water a small and sequestering quantity of sequestering water-soluble sodium polyphosphate salt for cation impurities in the resulting solution, and flash-drying said solution buffered to a pH of at least 7.4 whereby to form stable heart-center crystals.

14. The method which comprises dissolving in water quantities of sodium chloride and of oxygen-bearing nitrogen curing salt of alkali metal including essentially nitrite of alkali metal, the proportions of said salts being such as to form on flash drying the solution a mass of sodium chloride crytsals having heart-like centers of said nitrogen curing salt, dissolving also a minor quantity of hygroscopic material which in taking on water forms a liquid partitioning anticaking agent between the crystals to be formed, dissolving also in said water a small and sequestering quantity of sequestering water-soluble polyphosphate salt for cation impurities in the resulting solution, and flash-drying said solution buffered to a pH of at least 7.4 whereby to form stable heart-center crystals.

LLOYD A. HALL.

References Cited in the file of this patent

UNITED STATES PATENTS

| Number | Name | Date |
|---|---|---|
| 2,054,623 | Griffith | Sept. 15, 1936 |
| 2,054,624 | Griffith | Sept. 15, 1936 |
| 2,145,417 | Hall | Jan. 31, 1939 |
| 2,513,094 | Hall | June 27, 1950 |

OTHER REFERENCES

"The Chemistry and Technology of Food and Food Products," vol. II, 1944, by M. B. Jacobs, published by Interscience Publishers, Inc., New York, New York, pages 222 and 223.